I. IMBERT.
FEEDING DEVICE.
APPLICATION FILED MAR. 16, 1915.
1,241,388.
Patented Sept. 25, 1917.
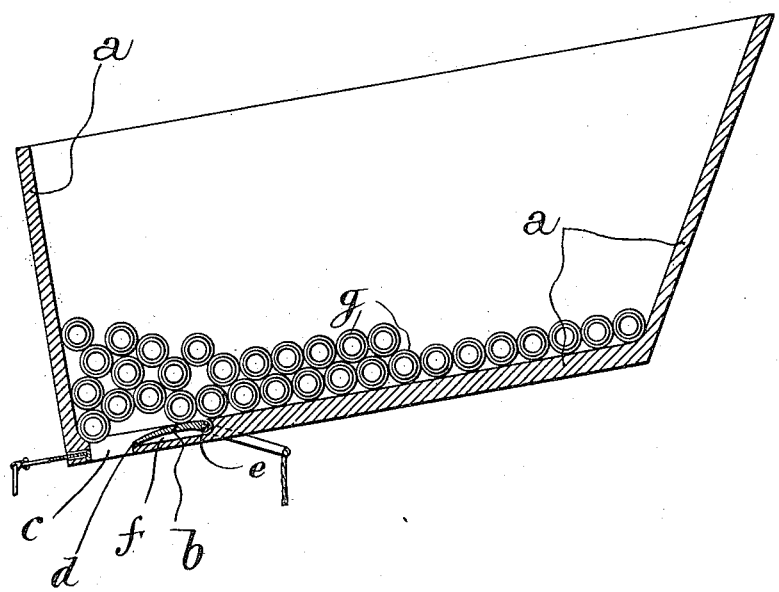
Witnesses:
Inventor
Iwan Imbert
by
Attorney

UNITED STATES PATENT OFFICE.

IWAN IMBERT, OF RAMONCHAMP, FRANCE.

FEEDING DEVICE.

1,241,388. Specification of Letters Patent. Patented Sept. 25, 1917.

Application filed March 16, 1915. Serial No. 14,851.

*To all whom it may concern:*

Be it known that I, IWAN IMBERT, citizen of the French Republic, residing at Ramonchamp, Vosges, France, have invented certain new and useful Improvements in Feeding Devices, of which the following is a specification.

This invention relates to feeding devices or systems of distribution, and is more particularly applicable to automatic weaving looms for the purpose of feeding them with cops.

It has for its chief object to reduce the cost and simplify the working and render the operation of such apparatus more reliable than has been the case hitherto.

The invention consists chiefly in using means having such a movement that as soon as jamming takes place in the articles to be distributed the said movable means frees them. Heretofore devices have been used in which partitions are provided subdividing a magazine into a series of parallel magazines, each of which can contain only a single series of the articles to be distributed; or a kind of wedge has been arranged in line with the outlet of the magazine.

The accompanying drawing shows diagrammatically in cross section a magazine for cops for automatic weaving looms, designed according to this invention.

A box $a$ is arranged to be fitted to automatic weaving looms so that its bottom is inclined out of the horizontal, and the said bottom is provided near its lowest end with an orifice or discharge opening $c$ adapted to allow the cops which are to be distributed, to pass through it one by one while they remain parallel to each other. The width of the box is slightly greater than the length of the cops.

To the sides of the said box $a$ a shutter $b$ is pivoted so that its distal edge $d$ which is parallel to its pivot $e$ is normally in line with one of the two edges of the orifice, either at the back or at the front (in the direction of travel of the cops moving toward it) preferably in line with the rear edge, and the said shutter is arranged to leave the said orifice free of obstruction. The shutter does not project normally beyond the bottom of the box $a$, or extend into the interior of the latter, but rests in a recess $f$, suitable to receive it, formed in the bottom of the box adjacent the rear edge of said discharge opening $c$ so as to form a substantial continuation of the upper surface of said bottom. It is contemplated in connection with this invention to oscillate the shutter $b$ about its pivot $e$ to describe a small arc within the interior of the box $a$, and this purpose may be accomplished by any suitable means with which the shutter $b$ may be connected, so that the object and purpose of the invention may be carried out. It will thus be seen that as the cops $g$ within the box or magazine $a$ crowd or jam at the discharge opening $c$, the operation of the shutter $b$ will disturb the position of the cops and break the bridge formed across the opening $c$ by the crowding of said cops. The shutter may be oscillated continuously, such as by automatic means, or may only be operated when occasion requires.

It will be noticed that the upper surface of the shutter is convexed so that as the same actuates within the magazine, said upper surface will engage with the cops and by reason of its convex formation will permit the cops to roll or rotate with respect thereto, thus preventing the same from being crushed or in any wise damaged by the action of the shutter $b$.

Thus a magazine is obtained which prevents the cops from jamming, as shown in the drawing; for the reason that owing to the action of the shutter on the jammed cops, the latter are freed.

Obviously the invention is not limited to the construction described, but comprises any modifications in which the magazine has in vertical longitudinal section, a different shape from that shown in the drawing, more particularly such a shape that it resembles a hopper or rectangular box.

What I claim as my invention and desire to secure by Letters Patent is:—

A cop-feeding attachment for looms, comprising a magazine to contain the cops, having a downwardly-inclined bottom wall formed at its lower end with a discharge opening of substantially the same size as the cops, toward which said cops tend to roll and through which they are adapted to pass one by one, said wall being also formed with a recess directly in rear of said opening so as to constitute a continuation thereof; and a shutter for controlling the discharge of the cops through said opening, pivoted at its rear end to the side walls of the magazine and normally resting in said recess with its front edge coinciding with the rear edge of said opening, said shutter having a convex upper face and being arranged to swing upwardly and rearwardly so as to engage the cops throughout their length and break arches formed by them at said opening, whereby said cops will be caused to roll along the convex face of the shutter during such swinging movement without being injured.

In testimony whereof I have hereunto set my hand in presence of two subscribing witnesses.

IWAN IMBERT.

Witnesses:
D. W. C. ROB, Jr.,
PAUL PLUM.

Copies of this patent may be obtained for five cents each, by addressing the "Commissioner of Patents, Washington, D. C."